(12) United States Patent
Lu et al.

(10) Patent No.: US 12,251,625 B2
(45) Date of Patent: Mar. 18, 2025

(54) CONTROL ASSEMBLY FOR PORTABLE ELECTRONIC DEVICE

(71) Applicant: DEXIN CORP., New Taipei (TW)

(72) Inventors: Ho Lung Lu, New Taipei (TW); Chun Te Yu, New Taipei (TW)

(73) Assignee: DEXIN CORP., New Taipei (TW)

( * ) Notice: Subject to any disclaimer, the term of this patent is extended or adjusted under 35 U.S.C. 154(b) by 266 days.

(21) Appl. No.: 17/994,096

(22) Filed: Nov. 25, 2022

(65) Prior Publication Data

US 2023/0256331 A1 Aug. 17, 2023

Related U.S. Application Data

(60) Provisional application No. 63/401,972, filed on Aug. 29, 2022.

(30) Foreign Application Priority Data

Feb. 16, 2022 (TW) .................................. 111105569

(51) Int. Cl.
A63F 13/24 (2014.01)
A63F 13/98 (2014.01)

(52) U.S. Cl.
CPC .............. *A63F 13/24* (2014.09); *A63F 13/98* (2014.09); *A63F 2300/1043* (2013.01)

(58) Field of Classification Search
CPC .......... A63F 13/24; A63F 13/98; A63F 13/92; A63F 2300/1043
See application file for complete search history.

(56) References Cited

U.S. PATENT DOCUMENTS

2021/0275907 A1* 9/2021 Khaira .................... A63F 13/92

* cited by examiner

*Primary Examiner* — Werner G Garner
(74) *Attorney, Agent, or Firm* — Maschoff Brennan (57) ABSTRACT

A control assembly adapted for an electronic device includes two controllers configured to be removably installed on the electronic device and a link mechanism comprising a retractable mechanism receptacle, a flexible part, and two guiding components, the two guiding components are located within the retractable mechanism receptacle, the flexible part is connected between the two controllers, at least part of the flexible part is retractably located in the retractable mechanism receptacle and disposed on the two guiding components, and a distance between the two guiding components is adjustable by the flexible part which is deformable by the two controllers.

13 Claims, 14 Drawing Sheets

CONTROL ASSEMBLY FOR PORTABLE ELECTRONIC DEVICE

CROSS-REFERENCE TO RELATED APPLICATIONS

This application claims the priority benefits of U.S. provisional application Ser. No. 63/391,530, filed on Jul. 22, 2022 and priority under 35 U.S.C. § 119(a) on Patent Application No(s). 111105569 filed in Taiwan (R.O.C.) on Feb. 16, 2022. The entirety of each of the above-mentioned patent application is hereby incorporated by reference herein.

TECHNICAL FIELD

The disclosure relates to a control assembly for portable electronic device.

BACKGROUND

In recent years, with the development of science and technology, people can play various video games on portable devices which have touch screen, such as smartphones or tablet computers. Even though there is a virtual controller on touch screens for the user to operate the video game, it is still very inconvenient to play because the virtual controller covers some part of the screen and lacks tactile feedback.

To this end, smartphone-based controllers are developed to provide physical buttons for users to run games smoothly. However, the conventional smartphone-based controllers are not flexible in changing size for storage, portability, or other purposes.

SUMMARY

Accordingly, one aspect of the disclosure is to provide a control assembly which enables a highly flexible operation.

One embodiment of the disclosure provides a control assembly adapted for an electronic device includes two controllers configured to be removably installed on the electronic device and a link mechanism comprising a retractable mechanism receptacle, a flexible part, and two guiding components, the two guiding components are located within the retractable mechanism receptacle, the flexible part is connected between the two controllers, at least part of the flexible part is retractably located in the retractable mechanism receptacle and disposed on the two guiding components, and a distance between the two guiding components is adjustable by the flexible part which is deformable by the two controllers.

According to the control assembly as discussed in the above embodiments of the disclosure, the controllers capable of being installed on the electronic device are connected to each other via the link mechanism which includes a flexible part partially retractably into the retractable mechanism receptacle, thus the positions of the controllers may be adjusted as required by deforming, retracting, extending the flexible part. This makes the controllers possible to fit various sizes of electronic device and realize a compact pocket size of the control assembly as required.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Figure 1:
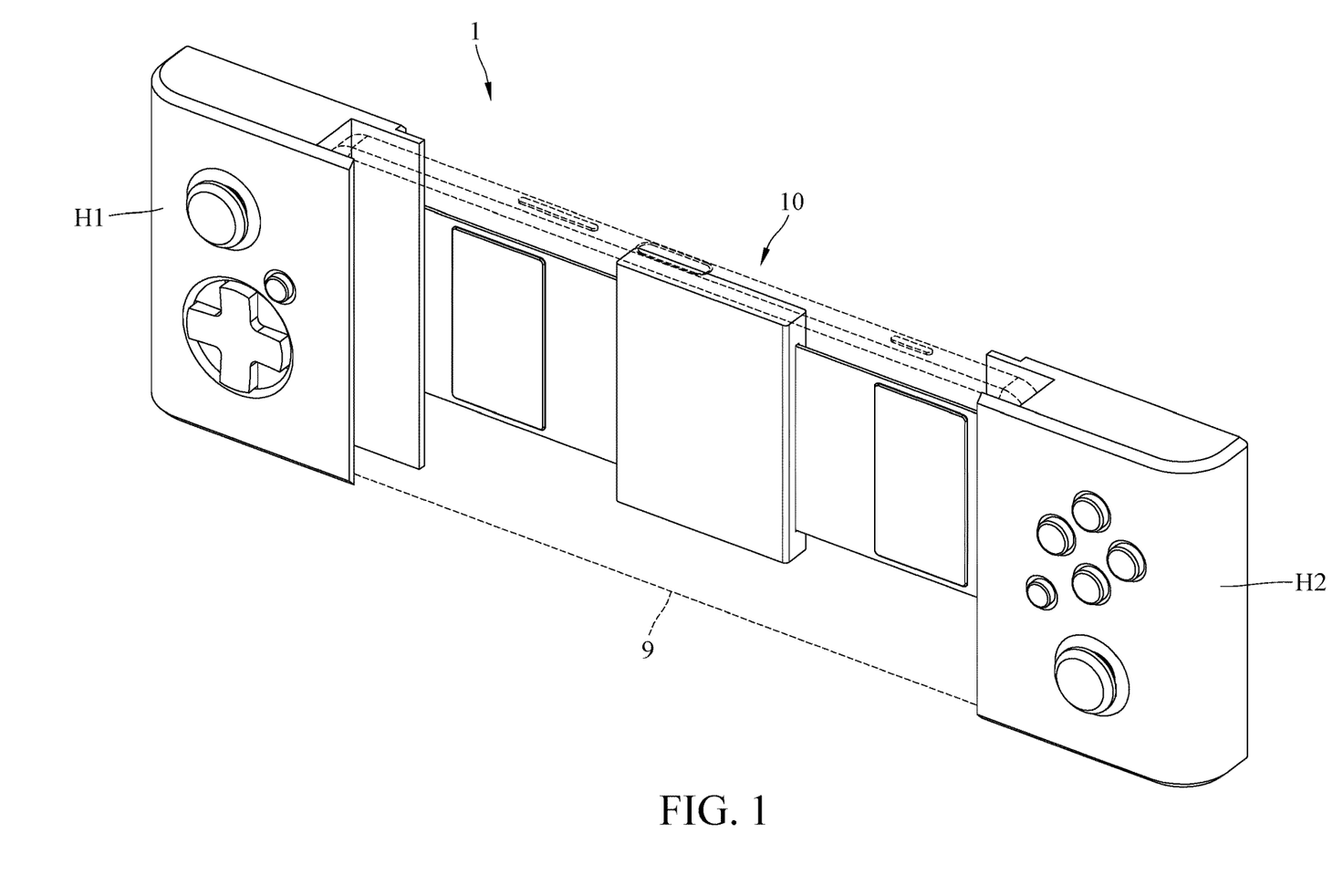
FIG. 1 is a perspective view of a control assembly according to one embodiment of the disclosure when being applied on an electronic device.

Firstly, referring to FIG. 1, one embodiment of the disclosure provides a control assembly 1 suitable for a portable electronic device 9 (also called "electronic device 9" hereinafter). The electronic device 9 may be but not limited to be a smartphone or tablet computer. The control assembly 1 is able to communicate with the electronic device 9 in any suitable wireless or wired manner so as to provide an approach for users to control the electronic device 9.

As shown, the control assembly 1 may include a link mechanism 10 and two controller (e.g., controllers H1 and H2). The controllers H1 and H2 are configured to be removably installed on two opposite sides of the electronic device 9, respectively, and configured for user to hold in hands and to operate the electronic device 9. Optionally, the controllers H1 and H2 may each has one or more buttons (not numbered) thereon for the operation of the electronic device 9. It is noted that the design and number of the button on each controller are provided for better understand the disclosure but not intended to limit the disclosure. The link mechanism 10 is connected between the controllers H1 and H2 to enable the position adjustment of the controllers H1 and H2 relative to each other.

Figure 2:
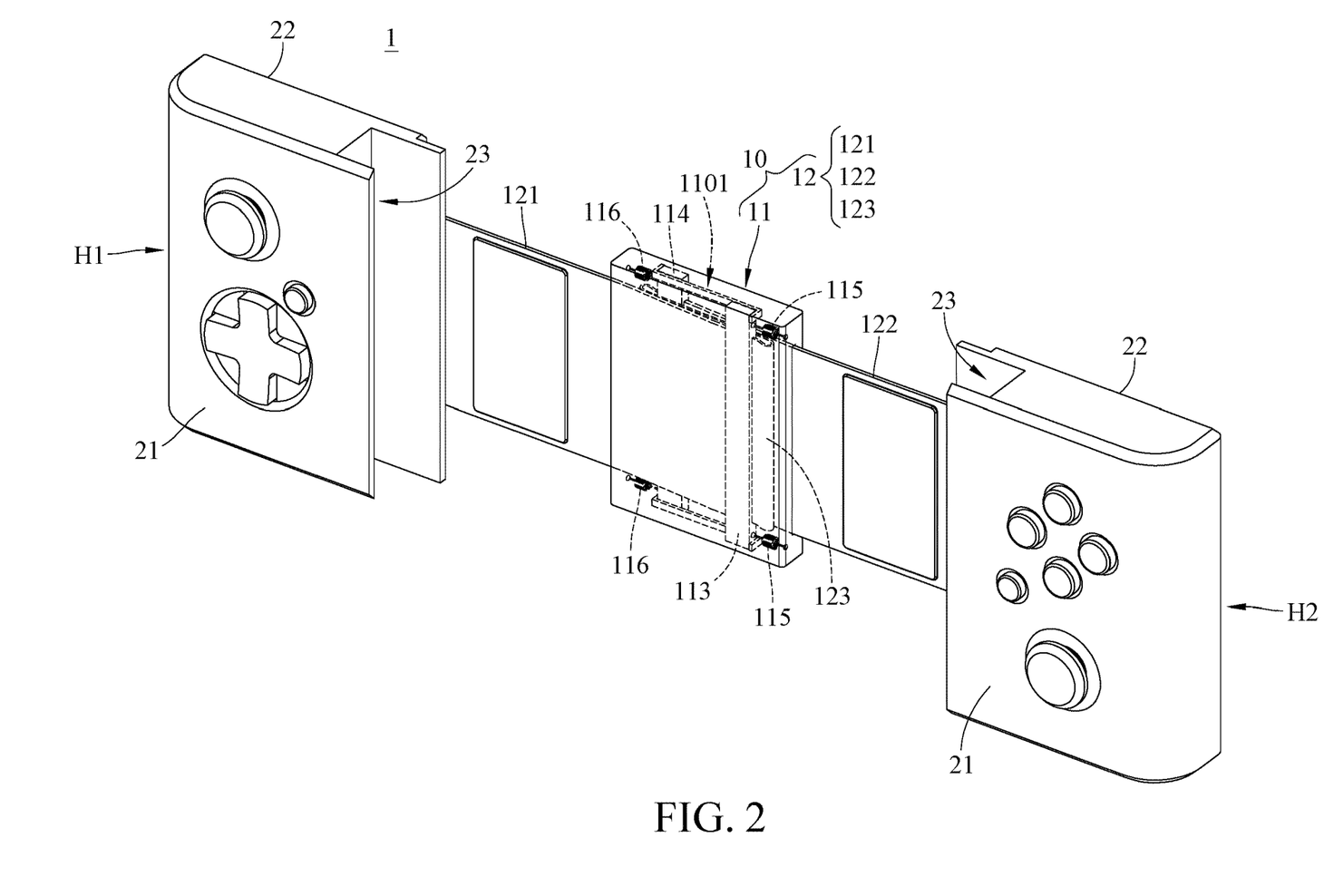
FIG. 2 depicts more details of the control assembly according to one embodiment of the disclosure.
Figure 3:
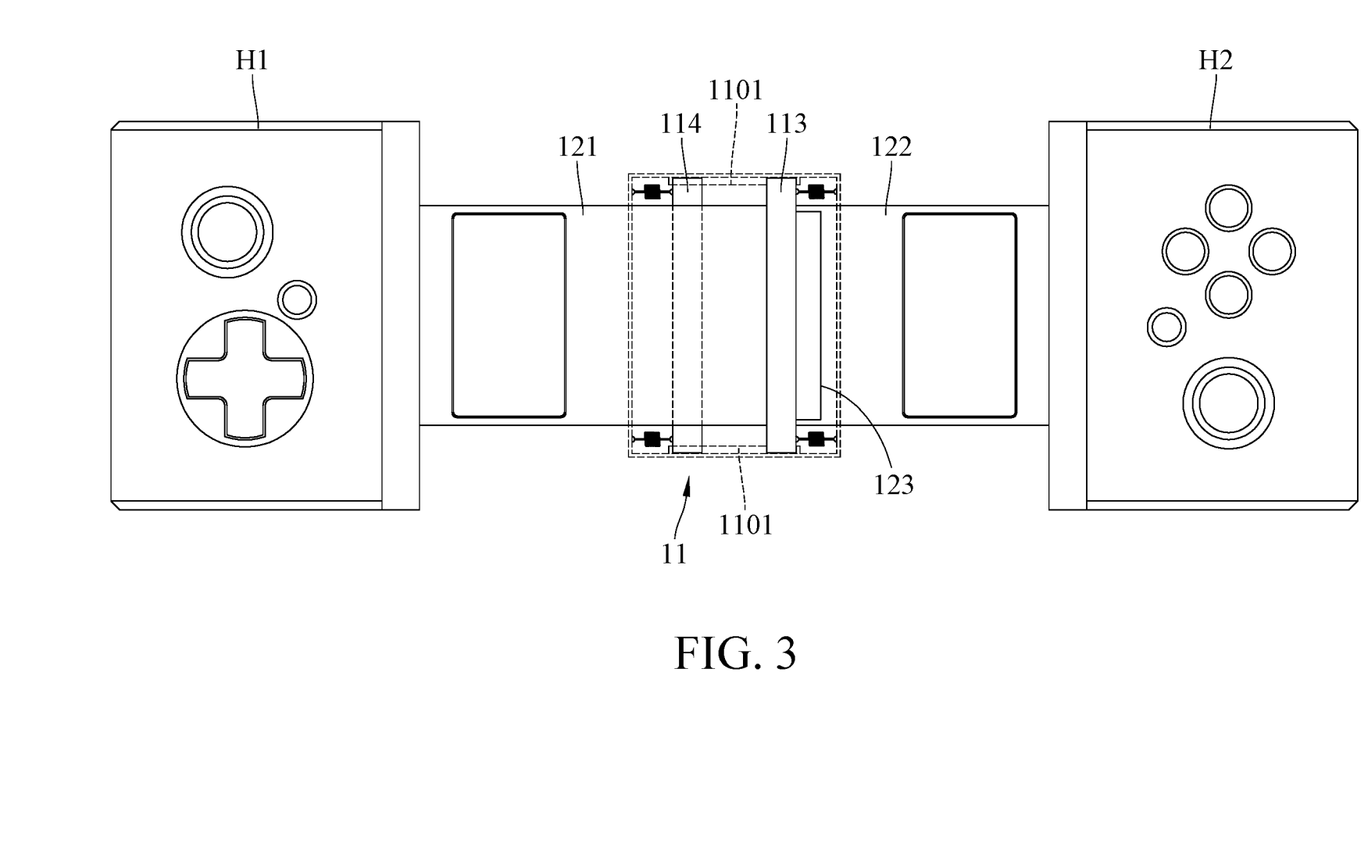
FIG. 3 is a front view of the control assembly in FIG. 2.
Figure 4:
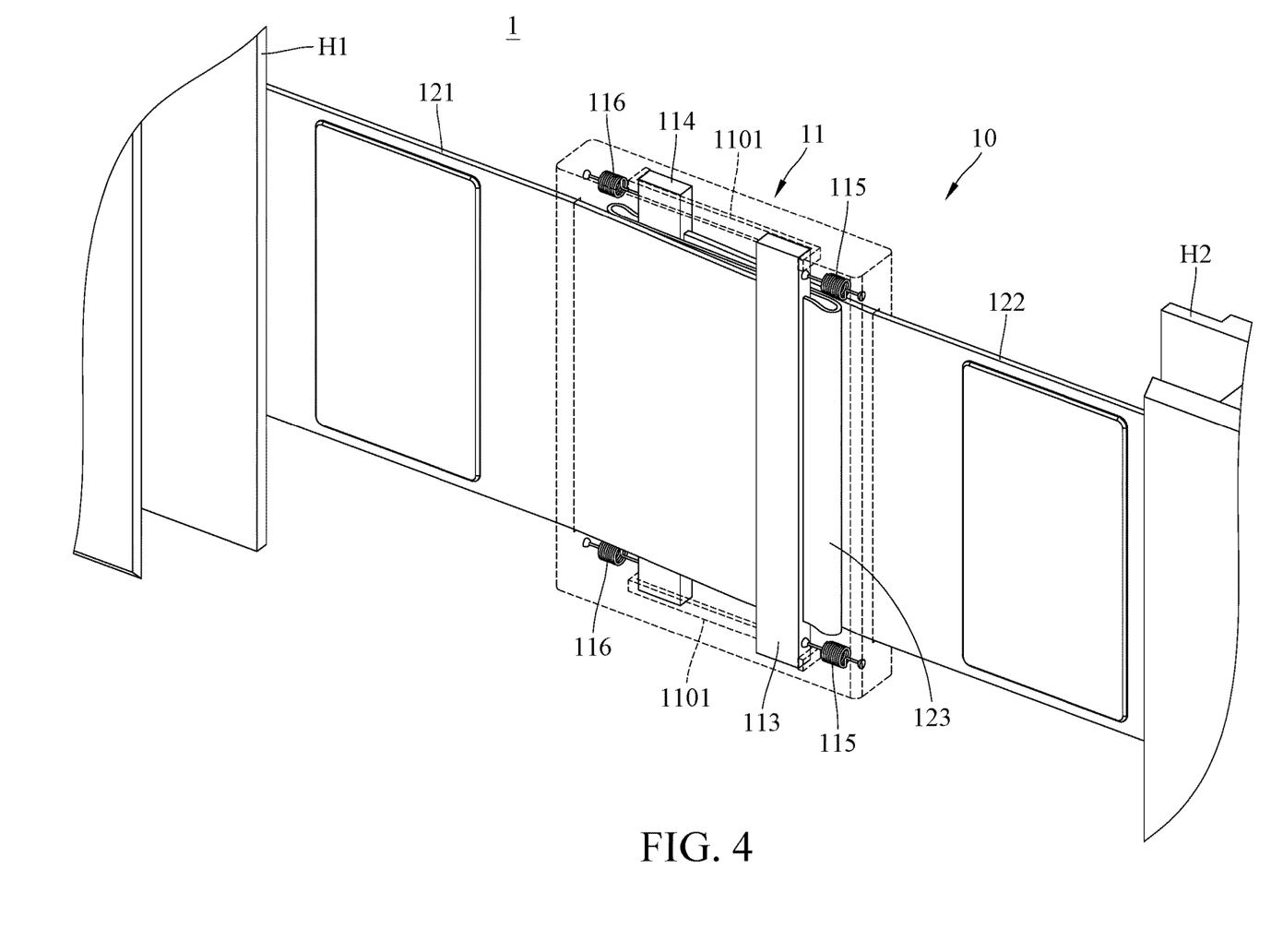
FIG. 4 is a partially-enlarged view of the control assembly in FIG. 2.

The details of the control assembly 1 are given below with reference to FIG. 1 and further reference to FIGS. 2-4. In this embodiment, the link mechanism 10 of the control assembly 1 may include a retractable mechanism receptacle 11 and a flexible part 12. The retractable mechanism receptacle 11 may be hollow. The flexible part 12 may be a thin layer of composite of flexible material and cable for signal. The flexible part 12 is connected between the controllers H1 and H2. Part of the flexible part 12 is retractably accommodated within the retractable mechanism receptacle 11. As shown, the part of the flexible part 12 accommodated within the retractable mechanism receptacle 11 may be deformed to be a serpentine shape In some embodiments, the controllers H1 and H2 may be electrically connected to each other via the flexible part 12. Specifically, the flexible part 12 may include a cable and an insulation and flexible material wrapping around the cable. Any conductive material suitable for the controllers H1 and H2 to transmit signal may be adopted to be the cable of the flexible part 12. The insulation and flexible material may be, but is not limited to, rubber, silicon, or composite thereof.

Regarding the arrangement of the flexible material and cable on the flexible part 12, the flexible part 12 may include a first flexible section 121, a second flexible section 122, and a third flexible section 123. The first flexible section 121 and the second flexible section 122 means the part of the flexible part 12 in which the cable is covered by the flexible material, and the third flexible section 123 means the part of the flexible part 12 in which the cable is not covered by the flexible material. In other words, the part of the flexible part 12 having both flexible material and cable denotes to the first flexible section 121 and the second flexible section 122, and the part of the flexible part 12 only having the cable denotes to the third flexible section 123. Thus, the third flexible section 123 is thinner than the first flexible section 121 and the second flexible section 122.

As shown, the third flexible section 123 is connected between the first flexible section 121 and the second flexible section 122 and may be accommodated within the retractable mechanism receptacle 11, and the third flexible section 123 is connected to the controllers H1 and H2 respectively via the first flexible section 121 and the second flexible section 122. Selectively, each of the first flexible section 121 and the second flexible section 122 may be partially located in the retractable mechanism receptacle 11. In such an arrangement, the controllers H1 and H2 may be movably connected to two opposite sides of the retractable mechanism receptacle 11 via the first flexible section 121, the second flexible section 122, and the third flexible section 123 so as to adjust their positions as required.

In this embodiment, the link mechanism 10 of the control assembly 1 may further include two guiding components (e.g., guiding components 113 and 114). The guiding components 113 and 114 may have the same or similar configuration. The guiding components 113 and 114 may be arranged in the retractable mechanism receptacle 11. The first flexible section 121, the second flexible section 122, and the third flexible section 123 may be disposed on the guiding components 113 and 114; in specific, the first flexible section 121 and the third flexible section 123 may be respectively connected to two opposite sides of the guiding component 113, and the second flexible section 122 and the third flexible section 123 may be respectively connected to two opposite sides of the guiding component 114, and the third flexible section 123 may be respectively connected to a side of the guiding component 113 located away from the guiding component 114 and a side of the guiding component 114 located away from the guiding component 112 (that is, the third flexible section 123 may be respectively connected to the outermost sides of the guiding components 113 and 114). The distance between the guiding components 113 and 114 may be adjusted when the guiding components 113 and 114 is forced by the flexible part 12. Specifically, the guiding component 113 may be connected between the first flexible section 121 and the third flexible section 123, the guiding component 114 may be connected between the second flexible section 122 and the third flexible section 123, and the third flexible section 123 may be connected between the guiding components 113 and 114; in other words, the first flexible section 121 may be connected to an edge (or, end) of the third flexible section 123 via the guiding component 113, the second flexible section 122 may be connected to another edge (or, end) of the third flexible section 123 via the guiding component 114; that is, the first flexible section 121 and the second flexible section 122 may be connected to two opposite edges (or, two opposite ends) of the third flexible section 123 respectively via the guiding components 113 and 114.

Figure 5:
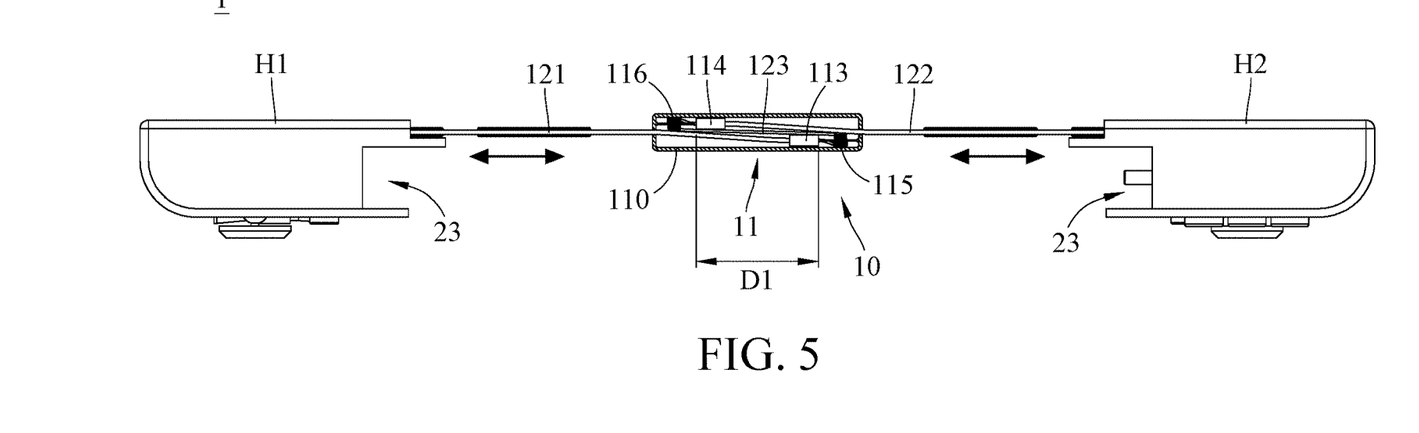
FIG. 5 is a top view of the control assembly in FIG. 2.

As shown in FIG. 5, the guiding components 113 and 114 may be arranged to be closer to two opposite sides of the retractable mechanism receptacle 11, respectively. In addition, the guiding components 113 and 114 may be respectively arranged at different sides of the third flexible section 123, and at least part of the third flexible section 123 may be located between the first flexible section 121 and the second flexible section 122 so as to overlap with part of the first flexible section 121 and part of the second flexible section 122.

Optionally, the retractable mechanism receptacle 11 may have at least two guiding structures 1101, the guiding structures 1101 may respectively protrude inwards from two opposite inner surfaces of the retractable mechanism receptacle 11. Two opposite ends of the guiding components 113 and 114 may be slidably disposed at the guiding structures 1101, respectively, such that the guiding structures 1101 can limit and guide the movable path of the guiding components 113 and 114.

Optionally, there may be one or more elastic component (e.g., elastic components 115 and 116) connected between the guiding components 113 and 114 and the retractable mechanism receptacle 11. The elastic components 115 and 116 may have the same or similar configuration. In some embodiments, there may be two elastic components 115 connected between the guiding component 113 and one side of the retractable mechanism receptacle 11, and there may be two elastic components 116 connected between the guiding component 114 and the opposite side of the retractable mechanism receptacle 11. As such, the elastic components 115 and 116 may constantly force the guiding components 113 and 114 to move towards two opposite sides of the retractable mechanism receptacle 11.

The flexible part 12 may be disposed through the guiding components 113 and 114, but the disclosure is not limited thereto. In some other embodiments, the guiding components 113 and 114 may be fixed to the flexible part 20 using, for example, adhesive, screw, or bolt.

As the link mechanism 10 discussed above, the controllers H1 and H2 are able to move the guiding components 113 and 114 and the elastic components 115 and 116 and the third flexible section 123 connected to the guiding components 113 and 114 by moving the first flexible section 121 and the second flexible section 122. The controllers H1 and H2 may be similar or the same in appearance and thus only the controller H1 will be introduced in detail below.

In this embodiment, the controller H1 may include a first surface 21 and a second surface 22 opposite to each other. The first surface 21 may face toward user while the controller H1 is in an in-use status. One or more buttons may be arranged on the first surface 21. The "in-use status" means a status of the controller H1 or H2 when the controllers H1 and H2 are in positions located relatively away from each other and suitable for being held in hands to operate or control the electronic device 9. The second surface 22 may located opposite to the user when the controller H1 is in the in-use status. The controller H1 may have a holding slot 23 located between the first surface 21 and the second surface 22 and configured to receive or accommodate part of the electronic device 9. Optionally, there may be one or more connector (not shown) arranged in the holding slot 23 for electrically connected to the electronic device 9. It is noted that the shape and size of the holding slot 23 may be modified as required.

Figure 6:
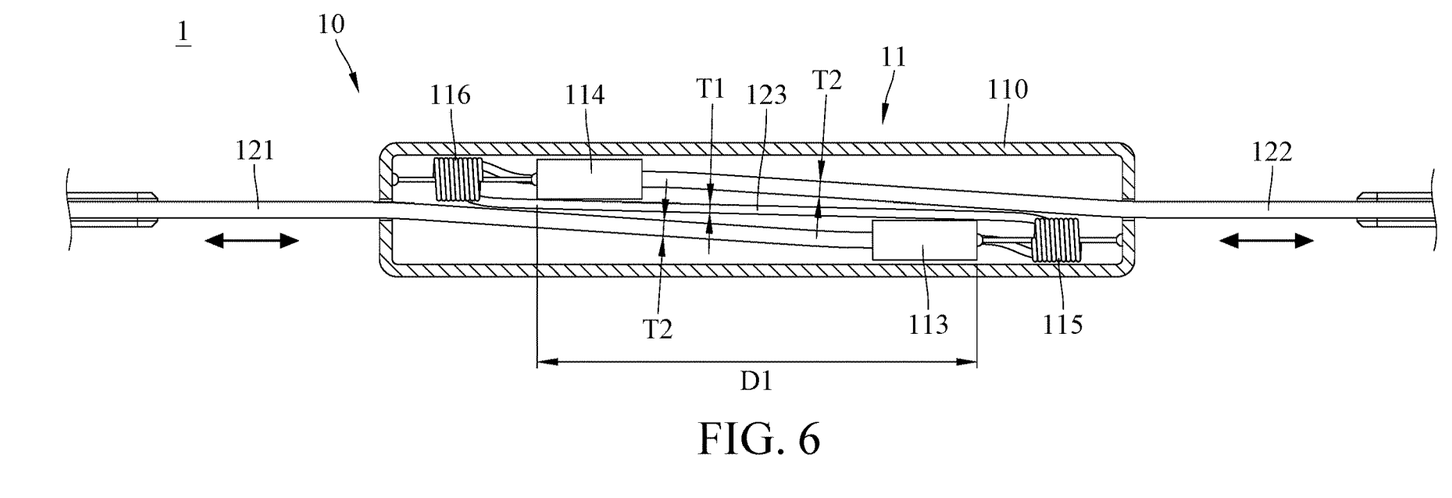
FIG. 6 is a partially-enlarged view of the control assembly in FIG. 5.

The operation of the control assembly 1 will be described below with reference to FIG. 1 and further reference to FIGS. 5-6. As indicated by the arrows, the controllers H1 and H2 may be moved in directions away from the retractable mechanism receptacle 11 to fit the size of an electronic device (e.g., the electronic device 9 in FIG. 1). During this movement, the controllers H1 and H2 may force the guiding components 113 and 114 to move towards each other by respectively pulling the first flexible section 121 and the second flexible section 122. By doing so, the distance between the guiding components 113 and 114 is shortened, and the elastic components 115 and 116 are extended by being forced by the guiding components 113 and 114. As such, the controllers H1 and H2 are allowed to be moved to positions that make two opposite ends of the electronic device 9 inserted into the holding slots 23.

When the user release the controllers H1 and H2, the force that the elastic components 115 and 116 act on the guiding components 113 and 114 may cause the first flexible section 121 and the second flexible section 122 to pull the controllers H1 and H2 towards the retractable mechanism receptacle 11 so as to make the controllers H1 and H2 press against the electronic device 9, thereby completing the installation of the control assembly 1 onto the electronic device 9.

FIG. 5 depicts the status of the control assembly 1 when the guiding components 113 and 114 are only receive force from the elastic components 115 and 116, at this moment, a distance between the outermost sides (or, the sides of the guiding components 113 and 114 located furthest away from each other) of the guiding components 113 and 114 denotes to D1, and the length of the third flexible section 123 at least longer than D1. This prevents the third flexible section 123 from being tighten when the guiding components 113 and 114 return to their original positions by the elastic components 115 and 116.

In addition, as discussed, the third flexible section 123 is thinner than the first flexible section 121 and the second flexible section 122, as shown, the thickness of the third flexible section 123 denotes to T1, the thickness of the first flexible section 121 and the second flexible section 122 denotes to T2, and T1<T2. This is favorable for minimizing the retractable mechanism receptacle 11.

As discussed, the flexible part 12 being connected between the controllers H1 and H2 may be partially accommodated within the retractable mechanism receptacle 11, and the positions among the controllers H1 and H2 and the retractable mechanism receptacle 11 may be adjusted by deforming the flexible part 12, thus the link mechanism 10 allows user to easily make the controllers H1 and H2 fit various sizes of electronic device.

In addition, the link mechanism also allows user to reduce the size of the control assembly by deforming the flexible part and moving the controllers. Specifically, please refer to FIGS. 7-8, another embodiment of the disclosure provides a control assembly 1a. For the purpose of simplicity, only the main differences between the following embodiment and the previous embodiment will be described in detail, and the same or similar parts of them may be comprehended with reference to the previous paragraphs and thus will not be repeatedly described hereinafter. It is also noted that the same reference number denote the same component or element.

Figure 7:
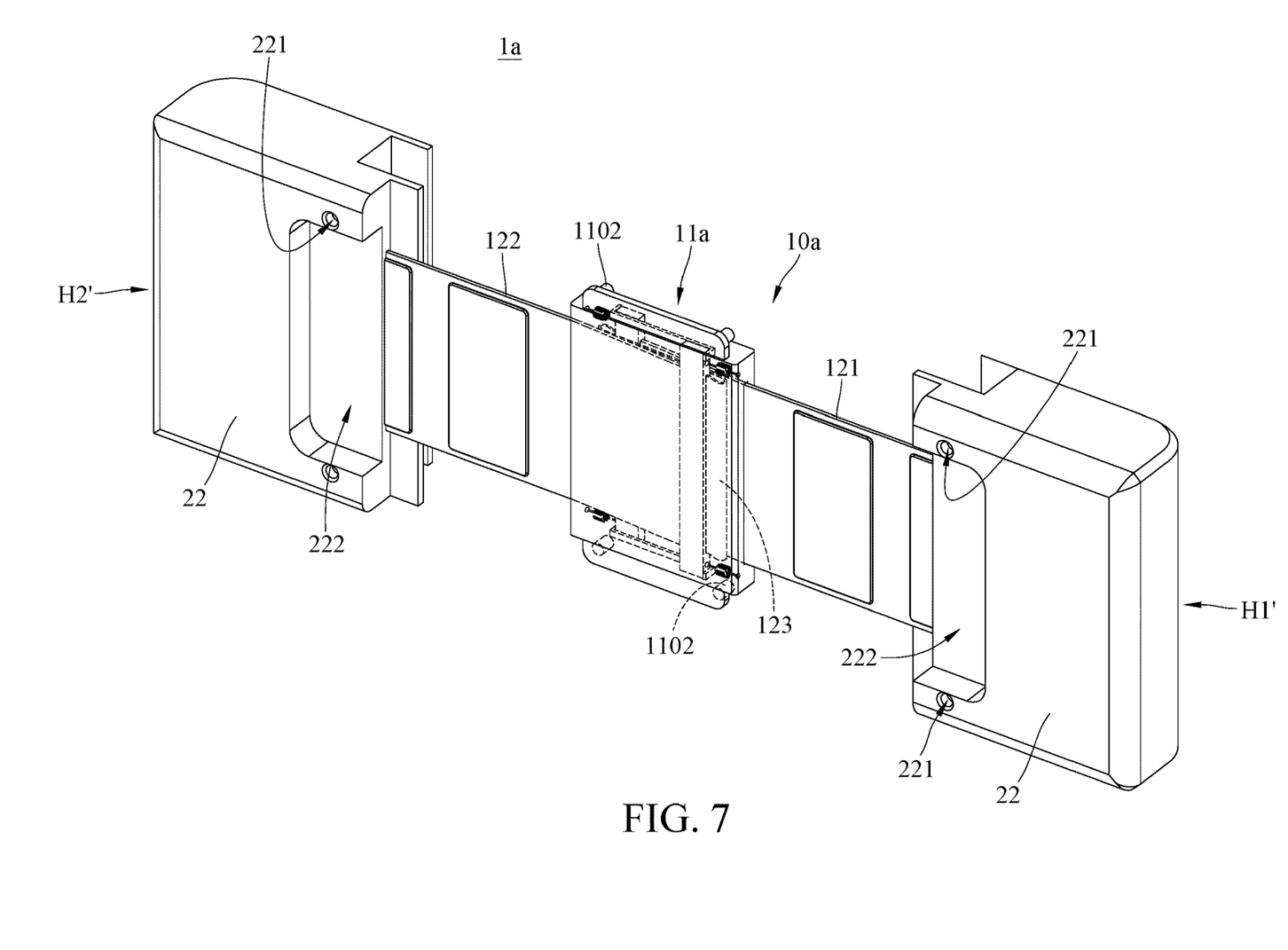
FIG. 7 is a perspective view of a control assembly according to another embodiment of the disclosure.
Figure 8:
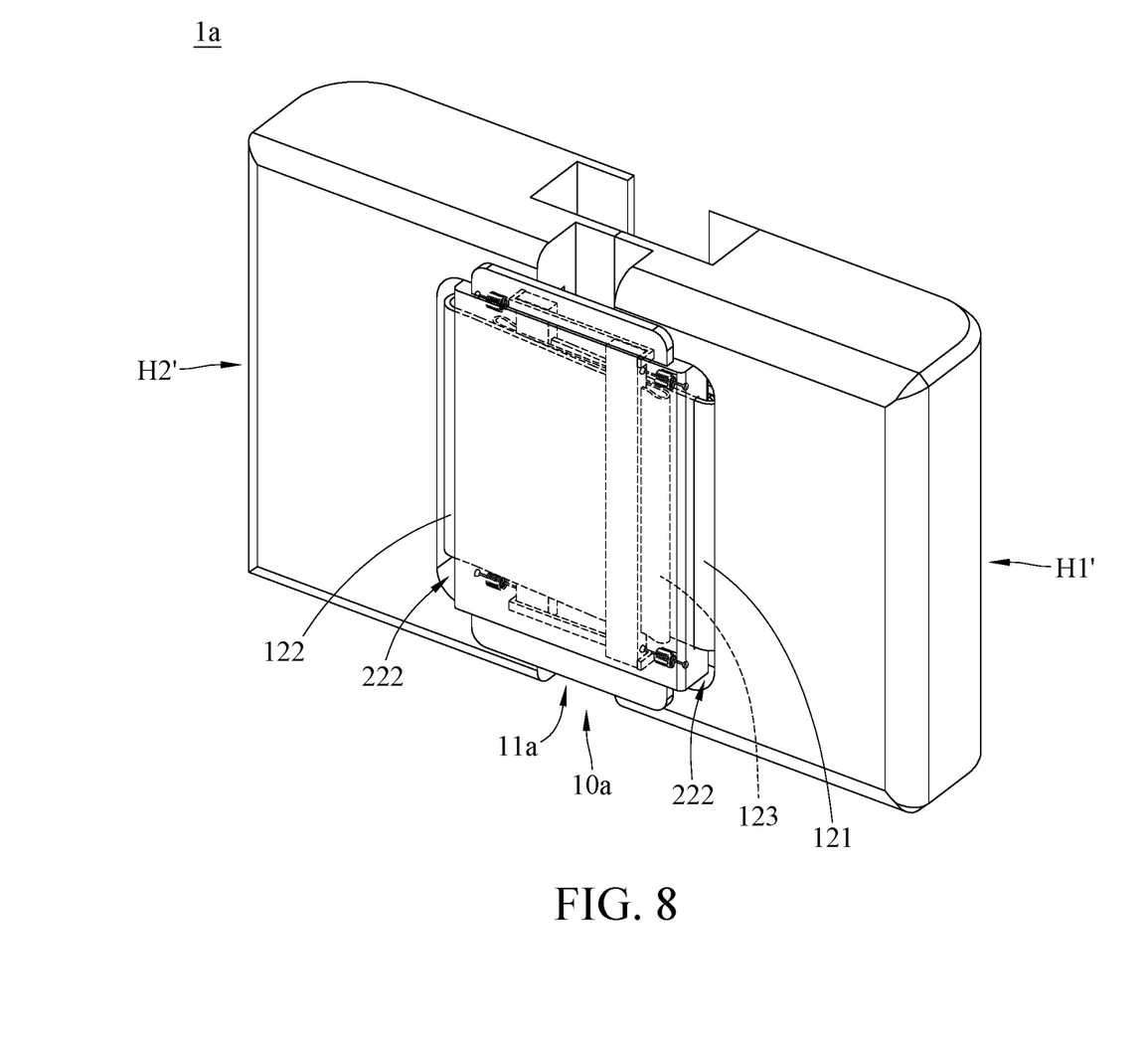
FIG. 8 is a perspective view of the control assembly in FIG. 7 being switched to a stored status.

As shown, a link mechanism 10a of the control assembly 1a may include a retractable mechanism receptacle 11a with at least two engagement protrusions 1102 protruding thereon; correspondingly, the second surfaces 22 of the controllers H1' and H2' may each have at least one engagement hole 221 thereon. In addition, the second surfaces 22 of the controllers H1' and H2' may each have a recess 222 having a contour mating part of the retractable mechanism receptacle 11a and part of the flexible part 12. In such an arrangement, with the help of the flexibility of the flexible part 12 and the retractability of the flexible part 12 into the retractable mechanism receptacle 11a, the flexible part 12 may be properly deformed and retracted into the retractable mechanism receptacle 11a to make the retractable mechanism receptacle 11a partially stacked on the second surfaces 22 of the controllers H1' and H2', by doing so, part of the retractable mechanism receptacle 11a and part of the flexible part 12 may be accommodated in the recesses 222 of the controllers H1' and H2', and the engagement protrusions 1102 on the retractable mechanism receptacle 11a may be inserted into the engagement holes 221 on the controllers H1' and H2'. As such, the control assembly 1a is switched to a stored status and it is largely reduced down to a compact pocket size.

Figure 9:
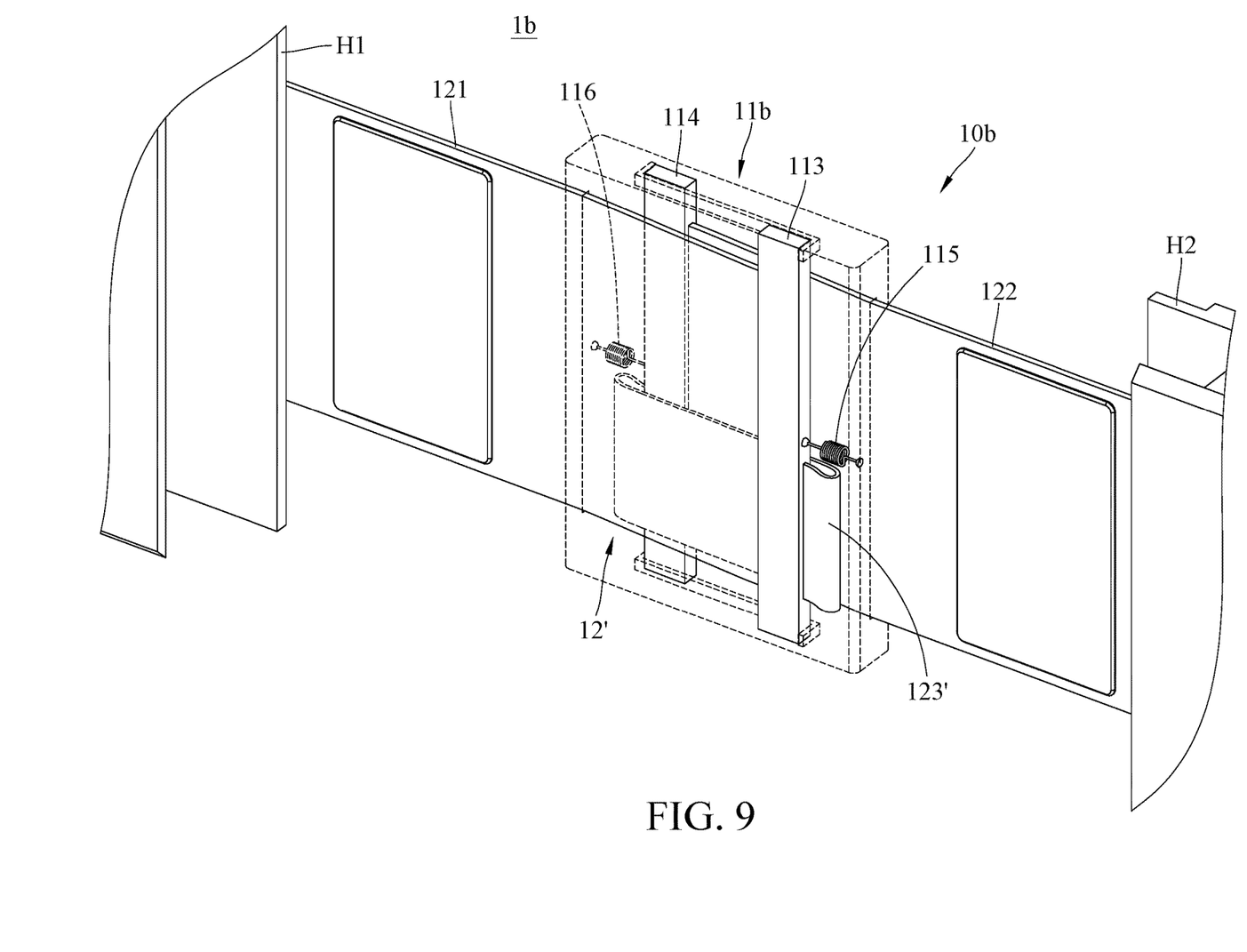
FIG. 9 is a partially-enlarged perspective view of a control assembly according to another embodiment of the disclosure.

Alternatively, please refer to FIG. 9, another embodiment of the disclosure provides a control assembly 1b. For the purpose of simplicity, only the main differences between the following embodiment and the previous embodiments will be described in detail, and the same or similar parts of them may be comprehended with reference to the previous paragraphs and thus will not be repeatedly described hereinafter. It is also noted that the same reference number denote the same component or element.

As shown, a link mechanism 10b of the control assembly 1b includes a flexible part 12' with a third flexible section 123', where the third flexible section 123' is displaced from the center and has a narrower width, such that the guiding components 113 and 114 spare a larger area for the placement of the elastic components 115 and 116. As such, the elastic components 115 and 116 in this embodiment may be arranged at the middle area of the guiding components 113 and 114. This is favorable for shortening the guiding components 113 and 114 and thus favorable for minimizing the retractable mechanism receptacle 11b.

Alternatively, please refer to FIGS. 10-13, another embodiment of the disclosure provides a control assembly 1c. For the purpose of simplicity, only the main differences between the following embodiment and the previous embodiments will be described in detail, and the same or similar parts of them may be comprehended with reference to the previous paragraphs and thus will not be repeatedly described hereinafter. It is also noted that the same reference number denote the same component or element.

As shown, a link mechanism 10c of the control assembly 1c includes a retractable mechanism receptacle 11c. In the retractable mechanism receptacle 11c, the flexible part 12 is wound on guiding components 113' and 114'. Specifically, the first flexible section 121 and part of the third flexible section 123 may be disposed on the guiding component 113', and the second flexible section 122 and another part of the third flexible section 123 may be disposed on the guiding component 114', the guiding components 113' and 114' may be arranged at different sides of the third flexible section 123, respectively, and at least part of the third flexible section 123 may be located between the first flexible section 121 and the second flexible section 122 so as to overlap with part of the first flexible section 121 and part of the second flexible section 122.

Figure 11:
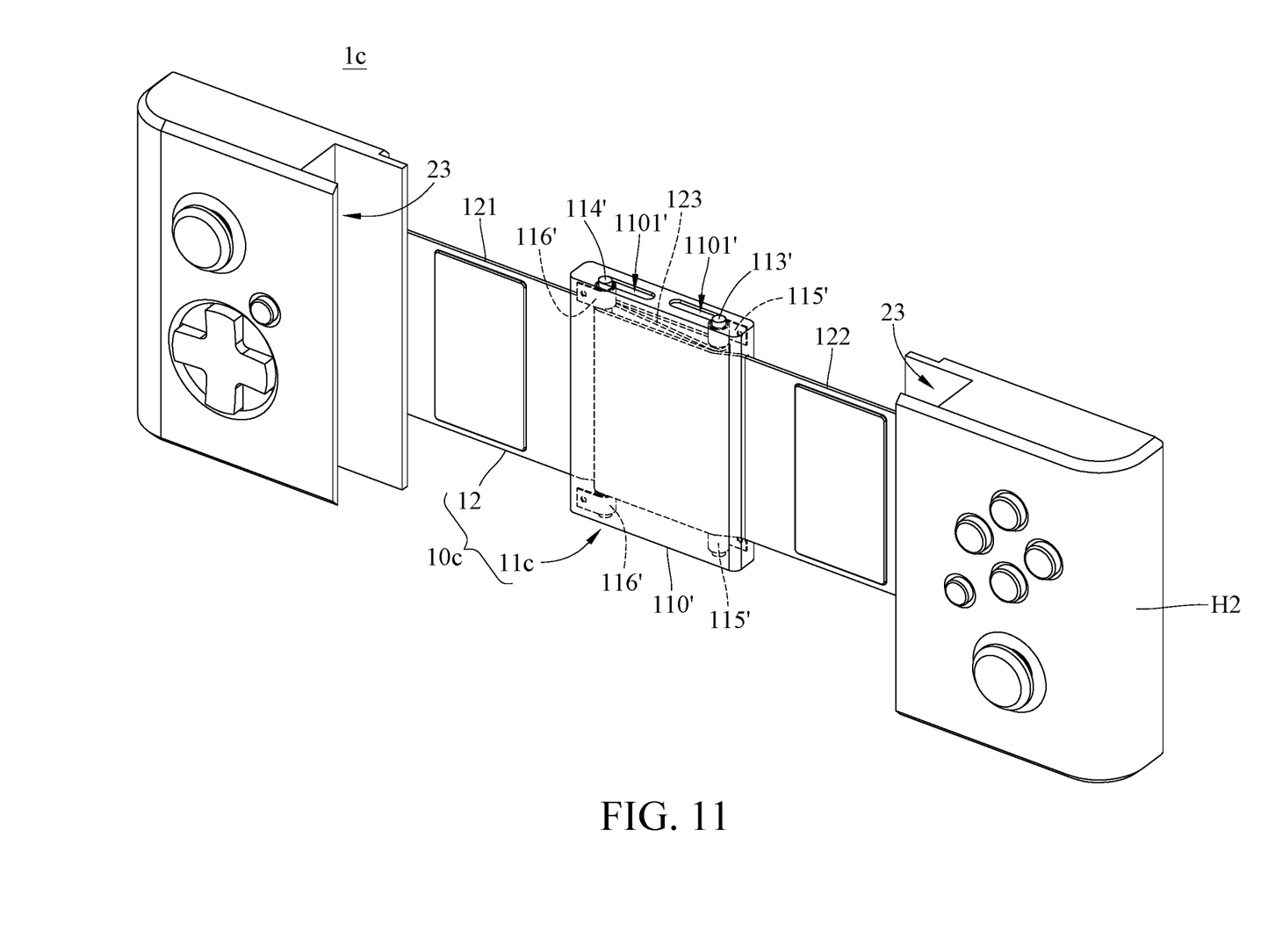
FIG. 11 depicts more details of the control assembly according to another embodiment of the disclosure.
Figure 12:
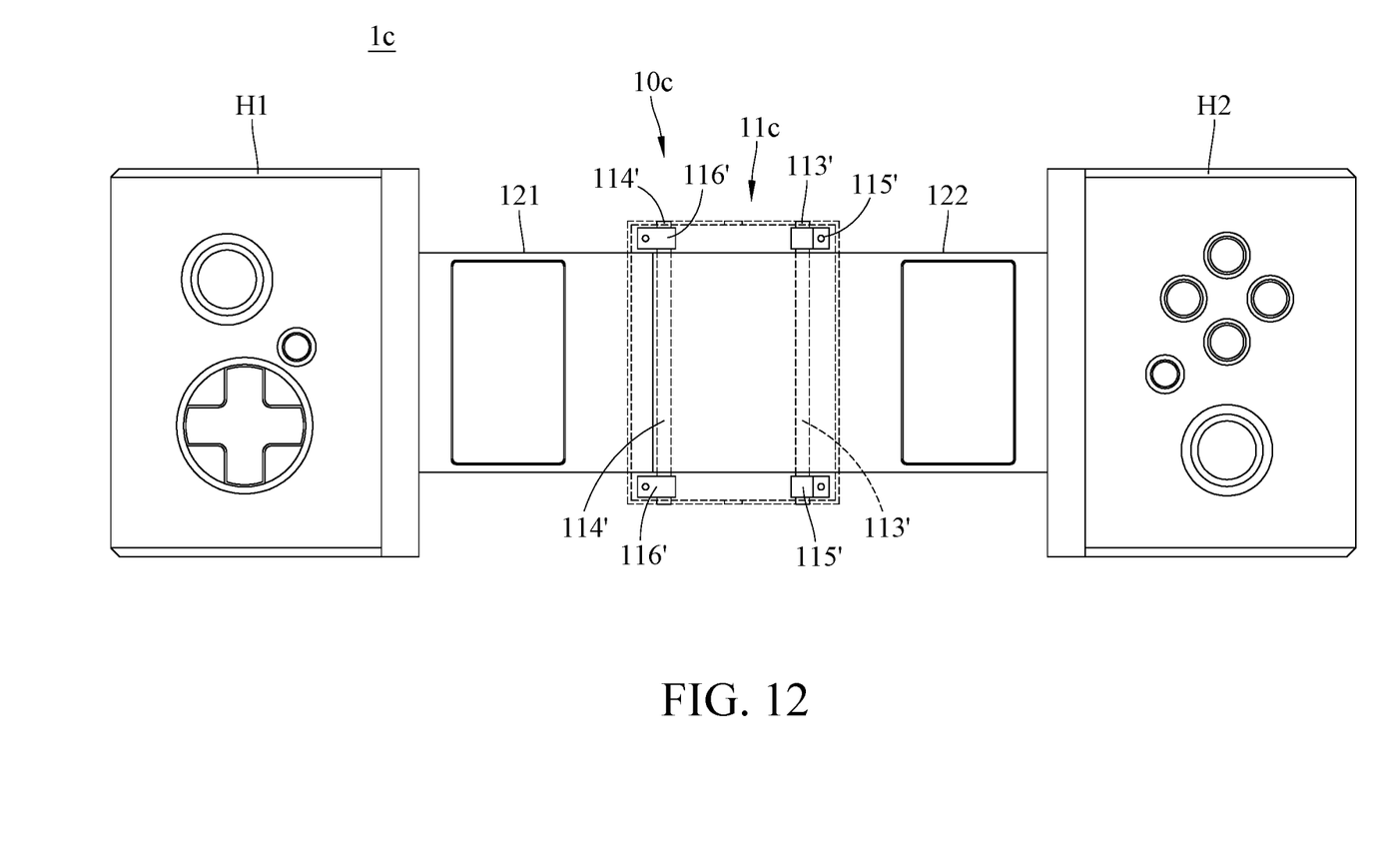
FIG. 12 is a front view of the control assembly in FIG. 11.
Figure 13:
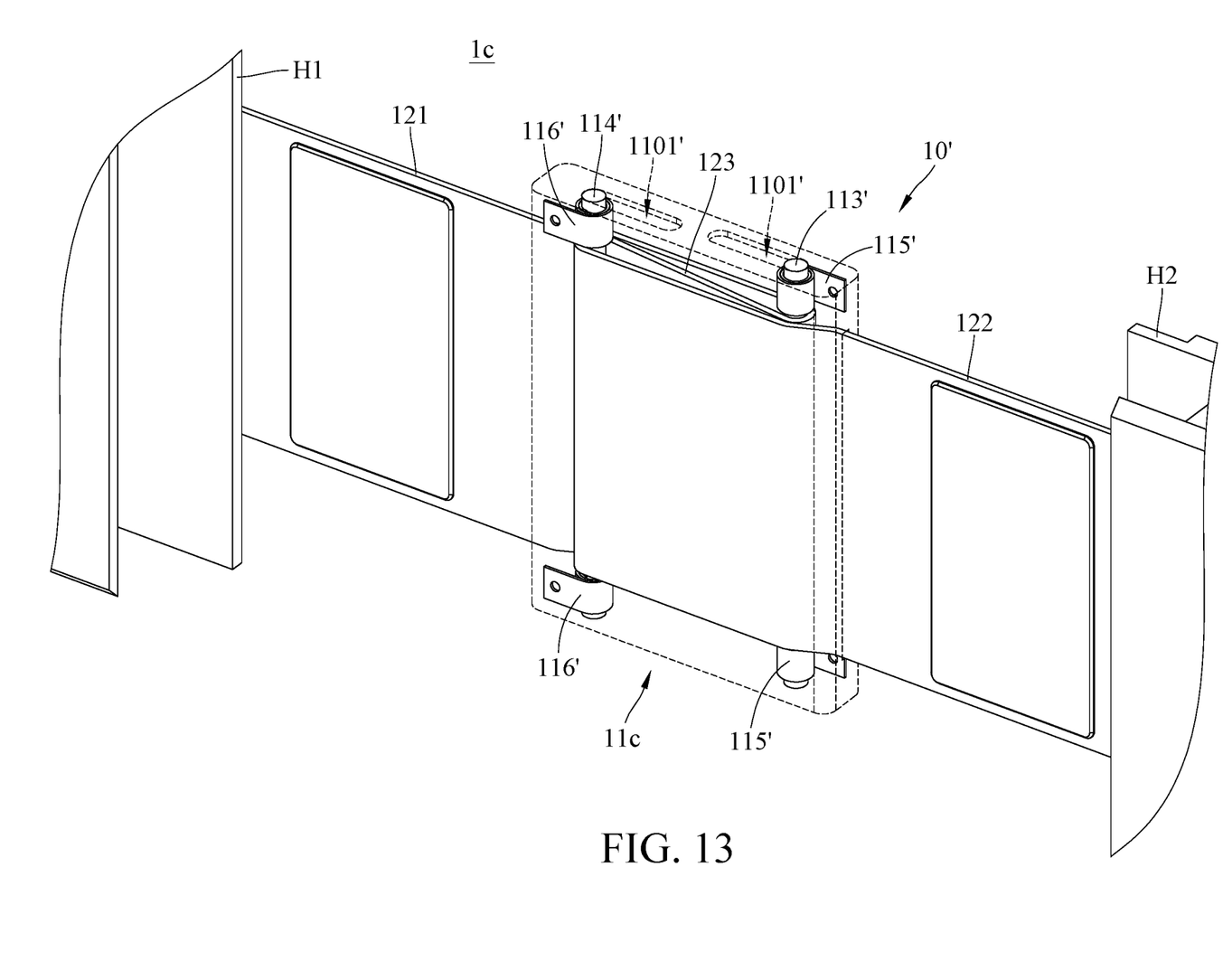
FIG. 13 is a partially-enlarged perspective view of the control assembly in FIG. 11.

In addition, guiding structures 1101' of the retractable mechanism receptacle 11c may be grooves located at two opposite sides of the retractable mechanism receptacle 11c, two opposite ends of the guiding components 113' and 114' may be slidably disposed in the guiding structures 1101', respectively, such that the guiding structures 1101' can limit and guide the movable path of the guiding components 113' and 114'.

In addition, there may be one or more elastic component (e.g., elastic components 115' and 116') connected between the guiding components 113' and 114' and the retractable mechanism receptacle 11c, where the elastic components 115' and 116' may be constant force springs. As shown, the elastic component 115' may be sleeved on the guiding component 113' and connected between the guiding component 113' and one side of the retractable mechanism receptacle 11c, the elastic component 116' may be sleeved on the guiding component 114' and connected between the guiding component 114' and another side of the retractable mechanism receptacle 11c. As such, the elastic components 115' and 116' may constantly force the guiding components 113' and 114' to move towards two opposite sides of the retractable mechanism receptacle 11c.

Figure 10:
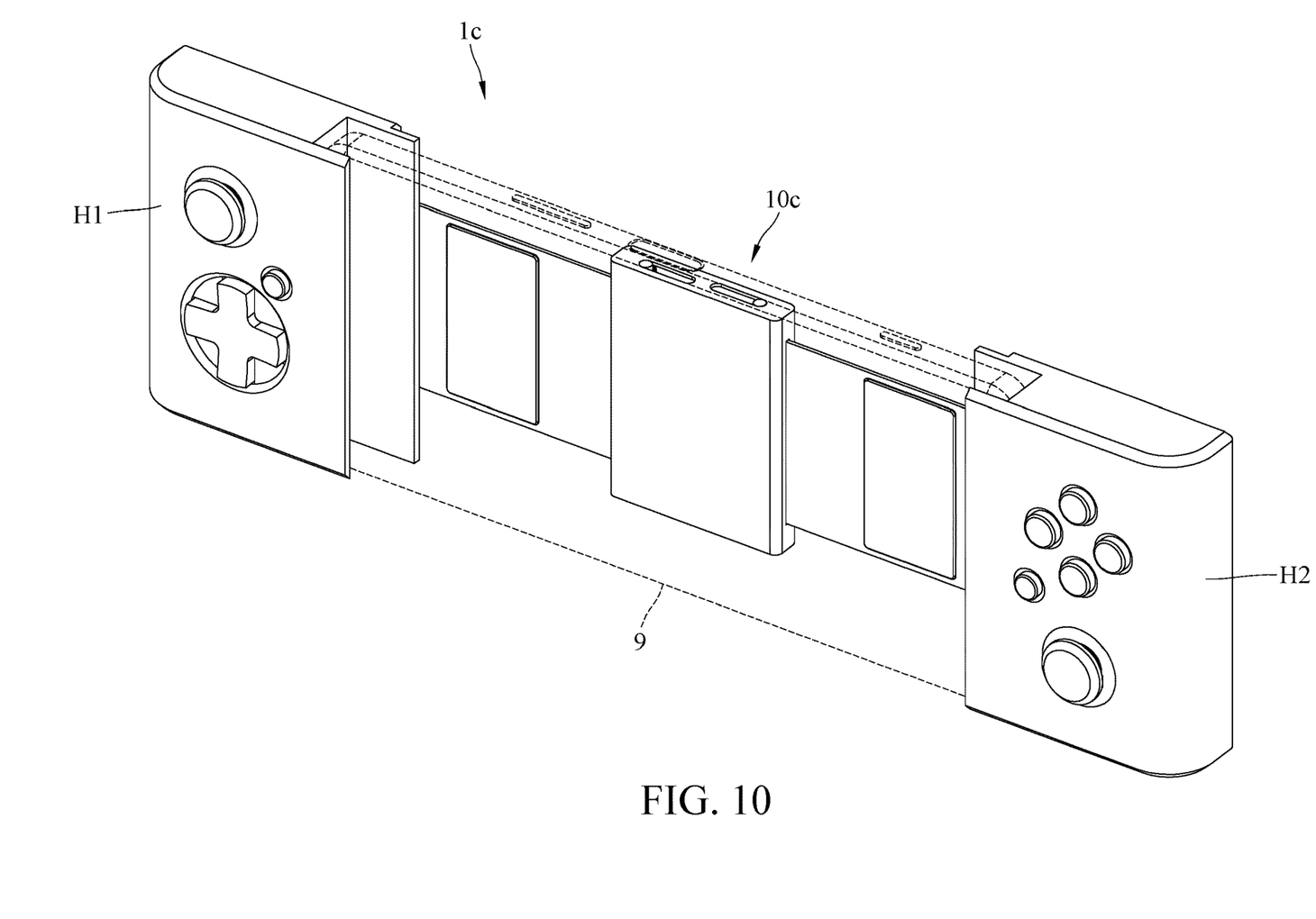
FIG. 10 is a perspective view of a control assembly according to another embodiment of the disclosure when being applied on an electronic device.
Figure 14:
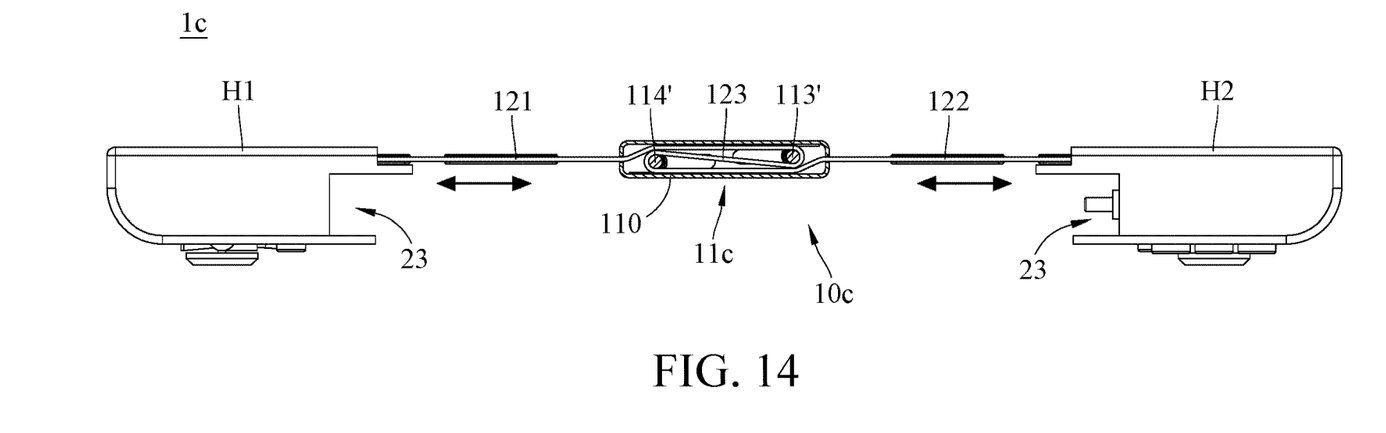
FIG. 14 is a top view of the control assembly in FIG. 11.
Figure 15:
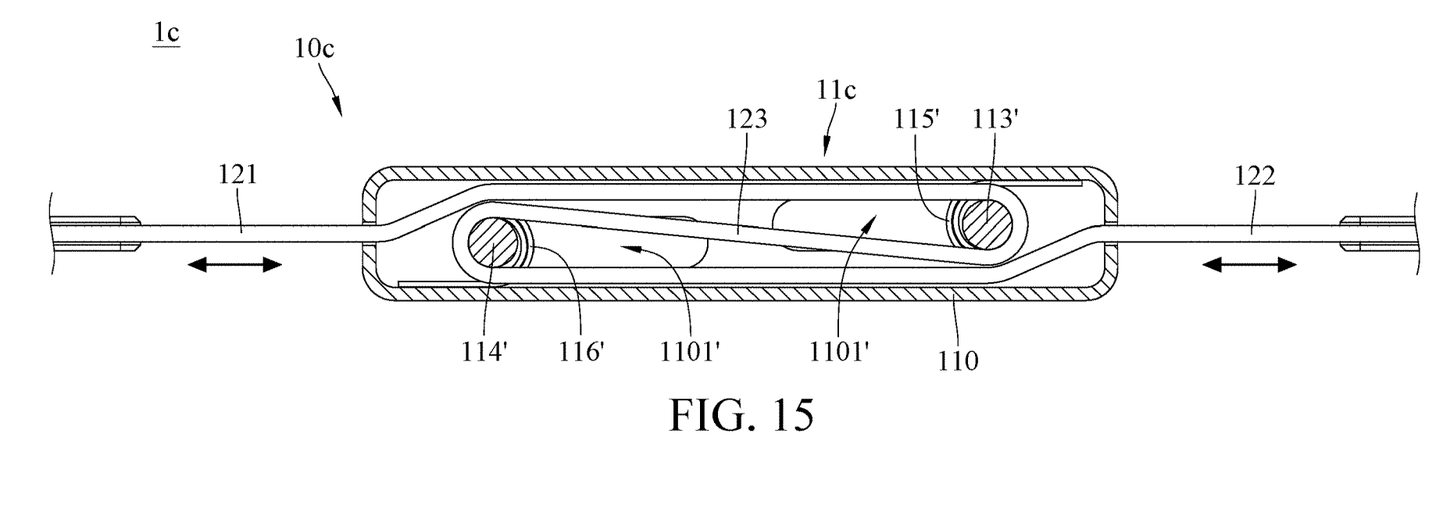
FIG. 15 is a partially-enlarged view of the control assembly in FIG. 14.

Then, the operation of the control assembly 1c will be described below with reference to FIG. 10 and further reference to FIGS. 14-15. As indicated by the arrows, the controllers H1 and H2 may be moved in directions away from the retractable mechanism receptacle 11c to fit the size of an electronic device (e.g., the electronic device 9 in FIG. 10). During this movement, the controllers H1 and H2 may force the guiding components 113' and 114' to move towards each other by respectively pulling the first flexible section 121 and the second flexible section 122. By doing so, the distance between the guiding components 113' and 114' is shortened, and the elastic components 115 and 116 are extended by being forced by the guiding components 113' and 114'. As such, the controllers H1 and H2 are allowed to be moved to positions that make two opposite ends of the electronic device 9 inserted into the holding slots 23.

When the user release the controllers H1 and H2, the force that the elastic components 115' and 116' act on the guiding components 113' and 114' may cause the first flexible section 121 and the second flexible section 122 to pull the controllers H1 and H2 towards the retractable mechanism receptacle 11c so as to make the controllers H1 and H2 press against the electronic device 9, thereby completing the installation of the control assembly 1 onto the electronic device 9.

Optionally, the link mechanism also allows user to reduce the size of the control assembly by deforming the flexible part and moving the controllers. Specifically, please refer to FIG. 16, another embodiment of the disclosure provides a control assembly 1d. For the purpose of simplicity, only the main differences between the following embodiment and the previous embodiment will be described in detail, and the same or similar parts of them may be comprehended with reference to the previous paragraphs and thus will not be repeatedly described hereinafter. It is also noted that the same reference number denote the same component or element.

Figure 16:
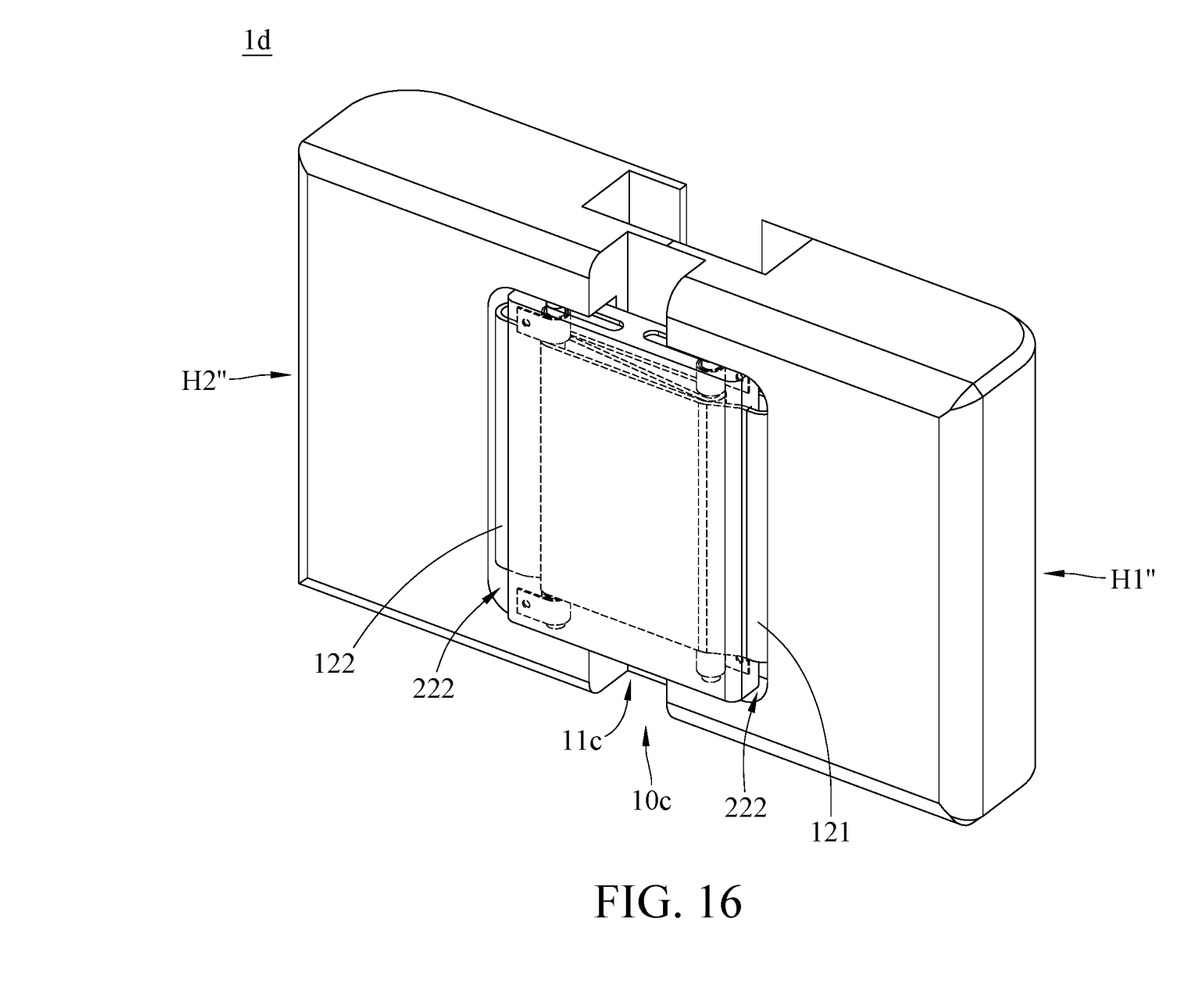
FIG. 16 is a perspective view of a control assembly according to another embodiment of the disclosure being switched to a stored status.

As shown, with the help of the flexibility of the flexible part 12 and the retractability of the flexible part 12 into the retractable mechanism receptacle 11c, the flexible part 12 may be properly deformed and retracted into the retractable mechanism receptacle 11c to make the retractable mechanism receptacle 11c and the flexible part partially accommodated in the recesses 222 of controllers H1" and H2". As such, the control assembly 1d is switched to a stored status and it is largely reduced down to a compact pocket size.

According to the control assembly as discussed in the above embodiments of the disclosure, the controllers capable of being installed on the electronic device are connected to each other via the link mechanism which includes a flexible part partially retractably into the retractable mechanism receptacle, thus the positions of the controllers may be adjusted as required by deforming, retracting, extending the flexible part. This makes the controllers possible to fit various sizes of electronic device and realize a compact pocket size of the control assembly as required.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control assembly, adapted for an electronic device, comprising:
   two controllers configured to be removably installed on the electronic device; and
   a link mechanism comprising a retractable mechanism receptacle, a flexible part, and two guiding components, wherein the two guiding components are located within the retractable mechanism receptacle, the flexible part is connected between the two controllers, at least part of the flexible part is retractably located in the retractable mechanism receptacle and disposed on the two guiding components, and a distance between the two guiding components is adjustable by the flexible part which is deformable by the two controllers;
   wherein the flexible part comprises a first flexible section, a second flexible section, and a third flexible section, the third flexible section is connected between the first flexible section and the second flexible section, one of the two guiding components is disposed at the first flexible section and the third flexible section, the other one of the two guiding components is disposed at the second flexible section and the third flexible section, at least part of the third flexible section is located between the first flexible section and the second flexible section and overlaps with at least part of the first flexible section and at least part of the second flexible section.

2. The control assembly according to claim 1, wherein the first flexible section and the third flexible section are respectively connected to two opposite sides of one of the two guiding components, the second flexible section and the third flexible section are respectively connected to two opposite sides of the other one of the two guiding components, and the two guiding components are respectively arranged at different sides of the third flexible section.

3. The control assembly according to claim 1, wherein the third flexible section is arranged within the retractable mechanism receptacle, and each of the first flexible section and the second flexible section is partially arranged within the retractable mechanism receptacle.

4. The control assembly according to claim 1, wherein the third flexible section is thinner than the first flexible section and the second flexible section.

5. The control assembly according to claim 1, wherein the first flexible section and the second flexible section comprises a part of a cable and an insulation material covered thereon, and the third flexible section comprises another part of the cable not covered by the insulation material.

6. The control assembly according to claim 1, wherein a distance between outermost sides of the two guiding components located furthest away from each other is D1, and a length of the third flexible section is longer than D1.

7. The control assembly according to claim 1, wherein the third flexible section is narrower than the first flexible section and the second flexible section.

8. The control assembly according to claim 1, further comprising at least two elastic components, wherein the two guiding components are connected to different sides of the retractable mechanism receptacle respectively via the at least two elastic components.

9. The control assembly according to claim 8, wherein the at least two elastic components each is an extension spring, the first flexible section and one of the at least two elastic components are respectively connected to different sides of one of the two guiding components, and the second flexible section and the other one of the at least two elastic components are respectively connected to different sides of the other one of the two guiding components.

10. The control assembly according to claim 8, wherein the at least two elastic components each is a constant force spring, and the at least two elastic components are respectively sleeved on the two guiding components.

11. The control assembly according to claim 1, wherein the retractable mechanism receptacle has at least two guiding structures, and the two guiding components are slidably engaged with the two guiding structures, respectively.

12. The control assembly according to claim 1, wherein each of the two controllers has a recess, when the control assembly is in a stored status, at least part of the retractable mechanism receptacle and the flexible part are located in the recesses of the two controllers.

13. The control assembly according to claim 1, wherein each of the two controllers has at least one engagement hole, the retractable mechanism receptacle has at least two engagement protrusions, when the control assembly is in a stored status, the at least two engagement protrusions are respectively engaged with the engagement holes.

* * * * *